(12) United States Patent
Simpson

(10) Patent No.: US 12,345,169 B2
(45) Date of Patent: Jul. 1, 2025

(54) THERMALLY COMPLIANT FORWARD OUTER-DIAMETER RING FOR A GAS TURBINE ENGINE

(71) Applicant: RTX Corporation, Farmington, CT (US)

(72) Inventor: Alex J. Simpson, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/447,167

(22) Filed: Aug. 9, 2023

(65) Prior Publication Data

US 2025/0052173 A1    Feb. 13, 2025

(51) Int. Cl.
| | | |
|---|---|---|
| *F01D 25/14* | (2006.01) | |
| *F01D 9/04* | (2006.01) | |
| *F01D 11/00* | (2006.01) | |
| *F01D 25/24* | (2006.01) | |

(52) U.S. Cl.
CPC ............ *F01D 25/14* (2013.01); *F01D 11/003* (2013.01); *F01D 11/005* (2013.01); *F01D 25/24* (2013.01); *F01D 25/246* (2013.01); *F01D 9/04* (2013.01); *F05D 2240/14* (2013.01); *F05D 2260/202* (2013.01)

(58) Field of Classification Search
CPC ........ F01D 25/24; F01D 25/246; F01D 25/26; F01D 9/02; F01D 11/005; F01D 11/006; F01D 11/008; F01D 25/12; F01D 25/14; F01D 25/145; F01D 25/30; F01D 25/305; F05D 2220/3215
See application file for complete search history.

(56) References Cited

U.S. PATENT DOCUMENTS

| | | | |
|---|---|---|---|
| 2,604,339 A * | 7/1952 | Kaysing | F16L 27/1004 |
| | | | 285/261 |
| 5,335,490 A | 8/1994 | Johnson et al. | |
| 5,417,056 A | 5/1995 | Johnson et al. | |
| 5,778,658 A | 7/1998 | Lamando et al. | |

(Continued)

FOREIGN PATENT DOCUMENTS

EP    2573329 B1    3/2020

OTHER PUBLICATIONS

Extended European Search Report dated Nov. 15, 2024, for corresponding European Patent Application No. 24181226.2, 8 pgs.

*Primary Examiner* — Woody A Lee, Jr.
*Assistant Examiner* — Wesley Le Fisher
(74) *Attorney, Agent, or Firm* — Kinney & Lange, P.A.

(57) ABSTRACT

A forward outer diameter ring includes a flowpath ring extending circumferentially about a central axis and extending axially from a first end to a second end relative to the central axis. The second end of the flowpath ring is axially aft of the first end. A hoop stiffener is connected to the second end of the flowpath ring and extends circumferentially around the second end of the flowpath ring. The hoop stiffener includes a first stiffener end connected to the second end of the flowpath ring and a second stiffener end axially aft of the first stiffener end. The hoop stiffener further includes tabs formed in the second stiffener end. The tabs are circumferentially spaced apart from one another and connect the case segments to the second stiffener end. The case segments are circumferentially arranged about the central axis relative one another.

19 Claims, 12 Drawing Sheets

(56) References Cited

U.S. PATENT DOCUMENTS

| | | | | |
|---|---|---|---|---|
| 7,086,219 B2 * | 8/2006 | Stretton | ............... | B64D 29/00 |
| | | | | 244/53 B |
| 7,798,765 B2 * | 9/2010 | Snyder | ............... | F02K 1/822 |
| | | | | 415/1 |
| 8,069,648 B2 * | 12/2011 | Snyder | ............... | F02K 1/822 |
| | | | | 60/761 |
| 8,484,943 B2 | 7/2013 | Cunha et al. | | |
| 8,939,713 B2 * | 1/2015 | Blin | ............... | B64D 29/00 |
| | | | | 415/220 |
| 9,784,126 B2 | 10/2017 | Army et al. | | |
| 9,845,696 B2 | 12/2017 | Lefebvre et al. | | |
| 10,077,669 B2 * | 9/2018 | Bifulco | ............... | F02C 7/04 |
| 10,975,721 B2 | 4/2021 | Lefebvre et al. | | |
| 11,015,613 B2 * | 5/2021 | Kerns | ............... | F01D 11/08 |
| 11,959,390 B2 * | 4/2024 | Savard | ............... | F02K 1/04 |
| 2007/0227152 A1 | 10/2007 | Bunel et al. | | |
| 2008/0253884 A1 | 10/2008 | Snyder et al. | | |
| 2011/0079019 A1 | 4/2011 | Durocher et al. | | |
| 2013/0266448 A1 * | 10/2013 | Blin | ............... | B64D 29/00 |
| | | | | 416/219 R |
| 2016/0146030 A1 * | 5/2016 | Bifulco | ............... | F02C 7/04 |
| | | | | 277/594 |
| 2018/0299133 A1 * | 10/2018 | Kramer | ............... | F23M 5/085 |
| 2018/0371947 A1 | 12/2018 | Sippel et al. | | |
| 2022/0390111 A1 * | 12/2022 | Ganiger | ............... | F23R 3/002 |

\* cited by examiner

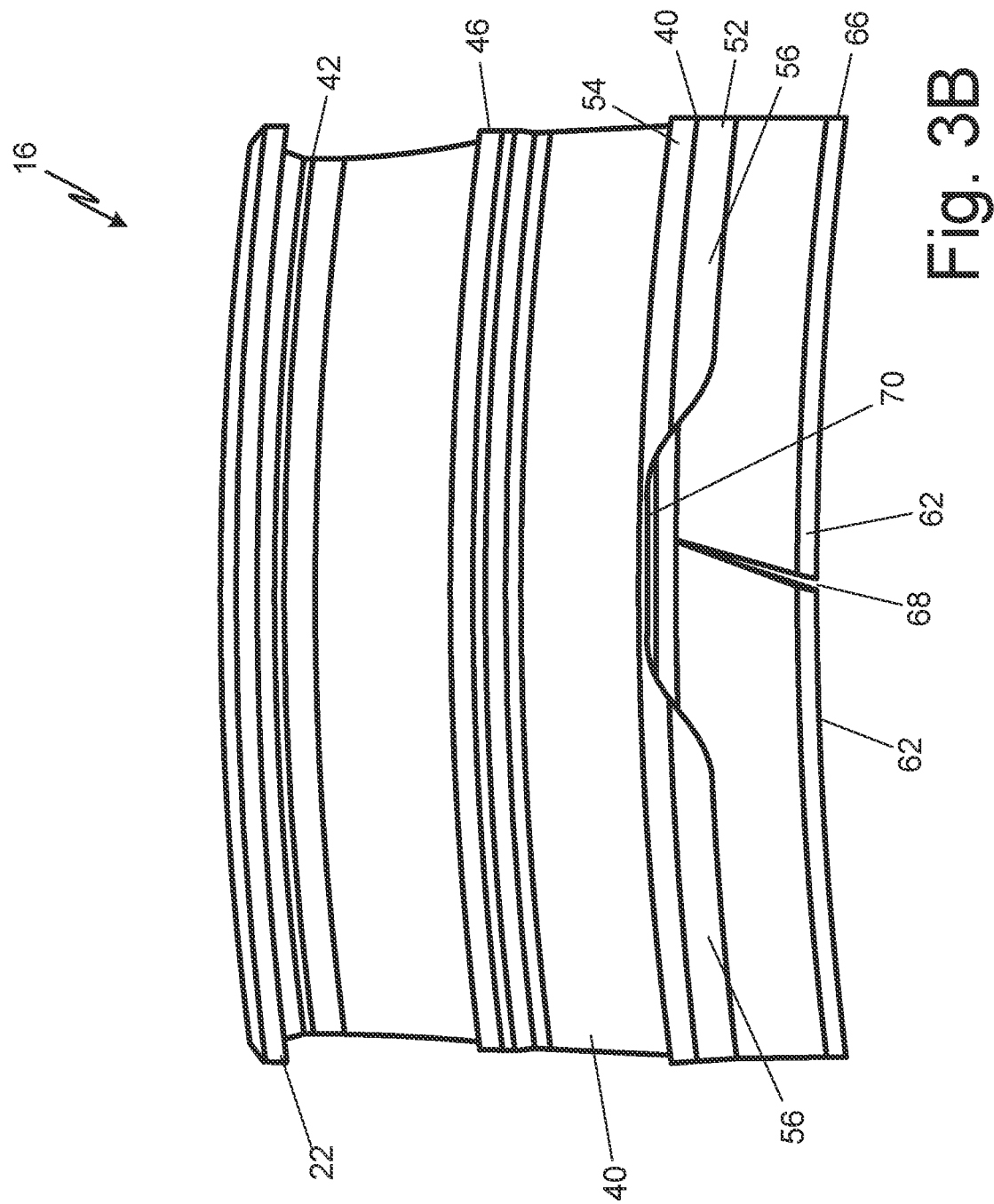

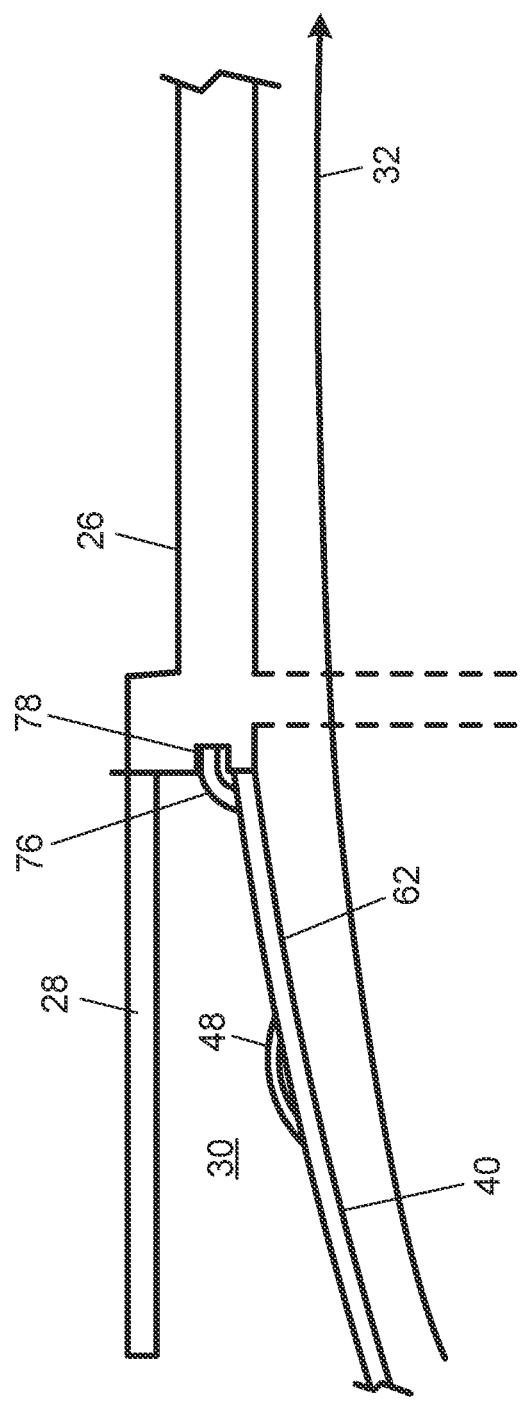

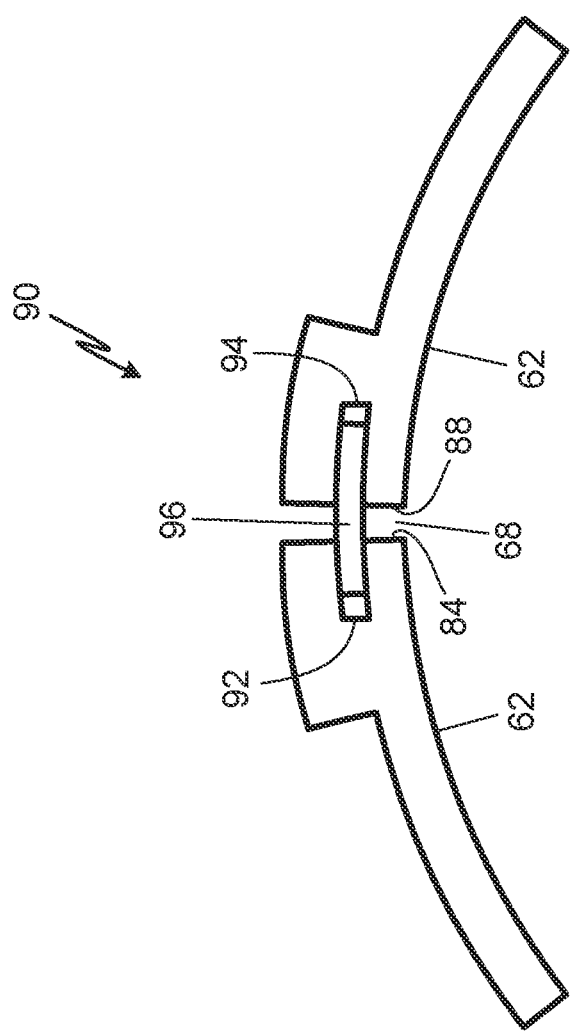

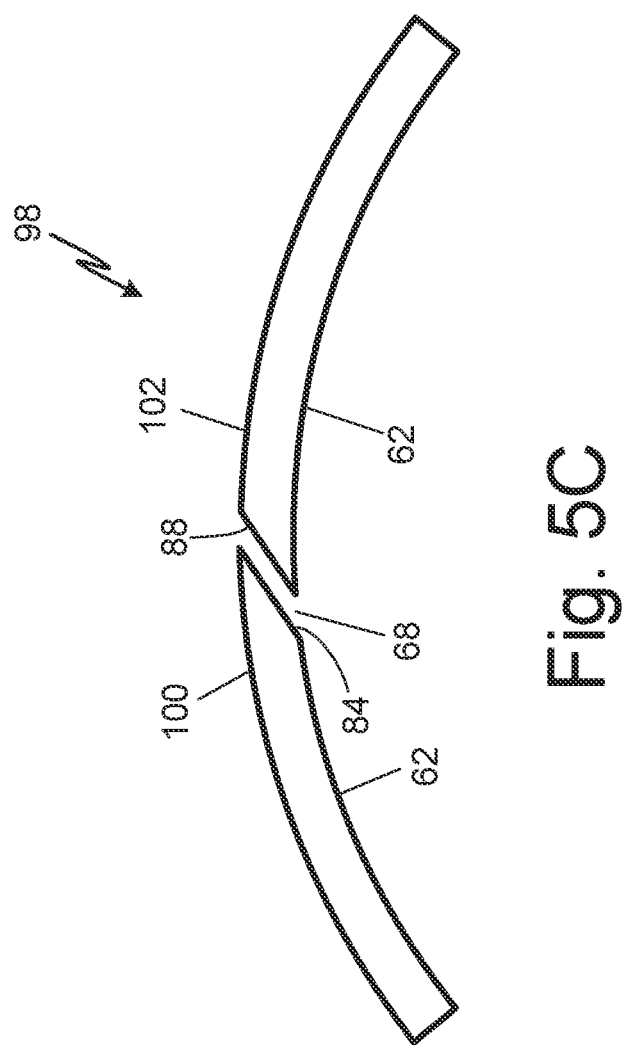

THERMALLY COMPLIANT FORWARD OUTER-DIAMETER RING FOR A GAS TURBINE ENGINE

STATEMENT OF GOVERNMENT INTEREST

This invention was made with government support under Contract N00019-17-C-0020 awarded by the United States Navy. The government has certain rights in this invention.

BACKGROUND

The present disclosure relates to a forward outer diameter ring (FODR) in a gas turbine engine.

Gas turbine engines generally include an exhaust system located at an aft end of the engine. These exhaust systems can include a turbine exhaust case (TEC) assembly that can be located aft of the turbine section or sections of the engine. The TEC assembly can straighten combustion gas flows for an afterburner. TEC assemblies generally include a FODR, located at a forward portion of the TEC assembly, that defines a portion of a hot gas flowpath of the gas turbine engine.

The FODR can be subject to adverse pressure gradients and high and uneven temperature levels during operation. For example, the FODR can be heated more at an aft portion than at a fore portion due to cooling holes being present in a fore portion of the FODR. These adverse and uneven conditions can lead to undesirable stress, wear, and damage to the FODR. Over time, these conditions can lead to shorter lifespans of the FODR, and lead to significant expenditures of time, effort, and money to repair or replace those the FODR. In addition, inadequate pressurization of a FODR plenum at the hot gas flowpath can produce a negative pressure difference and lead to undesirable inflow of hot gases into the FODR plenum.

SUMMARY

In one embodiment, a forward outer diameter ring includes a flowpath ring extending circumferentially about a central axis and extending axially from a first end to a second end relative to the central axis. The second end of the flowpath ring is axially aft of the first end. A hoop stiffener is connected to the second end of the flowpath ring and extends circumferentially around the second end of the flowpath ring. The hoop stiffener includes a first stiffener end connected to the second end of the flowpath ring and a second stiffener end axially aft of the first stiffener end. The hoop stiffener further includes tabs formed in the second stiffener end. These tabs are circumferentially spaced apart from one another and connect the case segments to the second stiffener end. The case segments are circumferentially arranged about the central axis relative one another.

In another embodiment, a cooled turbine exhaust case assembly for a gas turbine engine includes a forward outer diameter ring. The forward outer diameter ring includes a flowpath ring that extends circumferentially about a central axis and extends axially from a first end to a second end relative to the central axis. The second end is axially aft of the first end. A hoop stiffener is connected to the second end of the flowpath ring and extends circumferentially around the second end of the flowpath ring. The hoop stiffener includes a first stiffener end connected to the second end of the flowpath ring, a second stiffener end axially aft of the first stiffener end, and tabs formed in the second stiffener end. These tabs are circumferentially spaced apart from one another. The case segments are connected to the second stiffener end by the tabs. The case segments are circumferentially spaced about the central axis from one another. A seal extends axially along the slot and is connected to two of the case segments. The cooled turbine exhaust case assembly further includes a turbine case located radially outward of the forward outer diameter ring. A turbine exhaust case is axially aft the turbine case and is connected to the turbine case via a forward outer turbine exhaust case. A plenum is defined by the forward outer diameter ring, the turbine case, the turbine exhaust case, and the forward outer turbine exhaust case. The cooled turbine exhaust case assembly further includes an inlet opening in the turbine case for introducing cooling air to the plenum. One or more film cooling openings are in a fore region of the forward outer diameter ring and are configured to allow cooling air to exit the plenum to a hot gas path of the gas turbine engine to provide film cooling to the forward outer diameter ring.

BRIEF DESCRIPTION OF THE DRAWINGS

FIG. 3B is a top view of the forward outer diameter ring from FIG. 3A.

FIG. 4B is a cross-sectional view of a support hook on an aft end of a forward outer diameter ring.

FIG. 5B is a cross-sectional view of a feather seal for an axial cut in a forward outer diameter ring.

FIG. 5C is a cross-sectional view of an angled slot seal for an axial cut in a forward outer diameter ring.

DETAILED DESCRIPTION

This disclosure relates to a forward outer diameter ring (FODR) of a turbine exhaust case assembly with slots between two or more case segments at an aft end of the FODR. The slots permit case segments to expand circumferentially and radially due to the heating of the FODR during operation. When heated, the slots can be closed by the thermal expansion of the FODR. The slots enable the radius of the FODR to change minimally due to thermal expansion and therefore enables the outer gas path to stay laminar during both the cool state and the hot state of the gas turbine engine. Furthermore, these slots reduce the wear associated with buckling and plastic deformation when transitioning between the cool and hot states.

Figure 1:
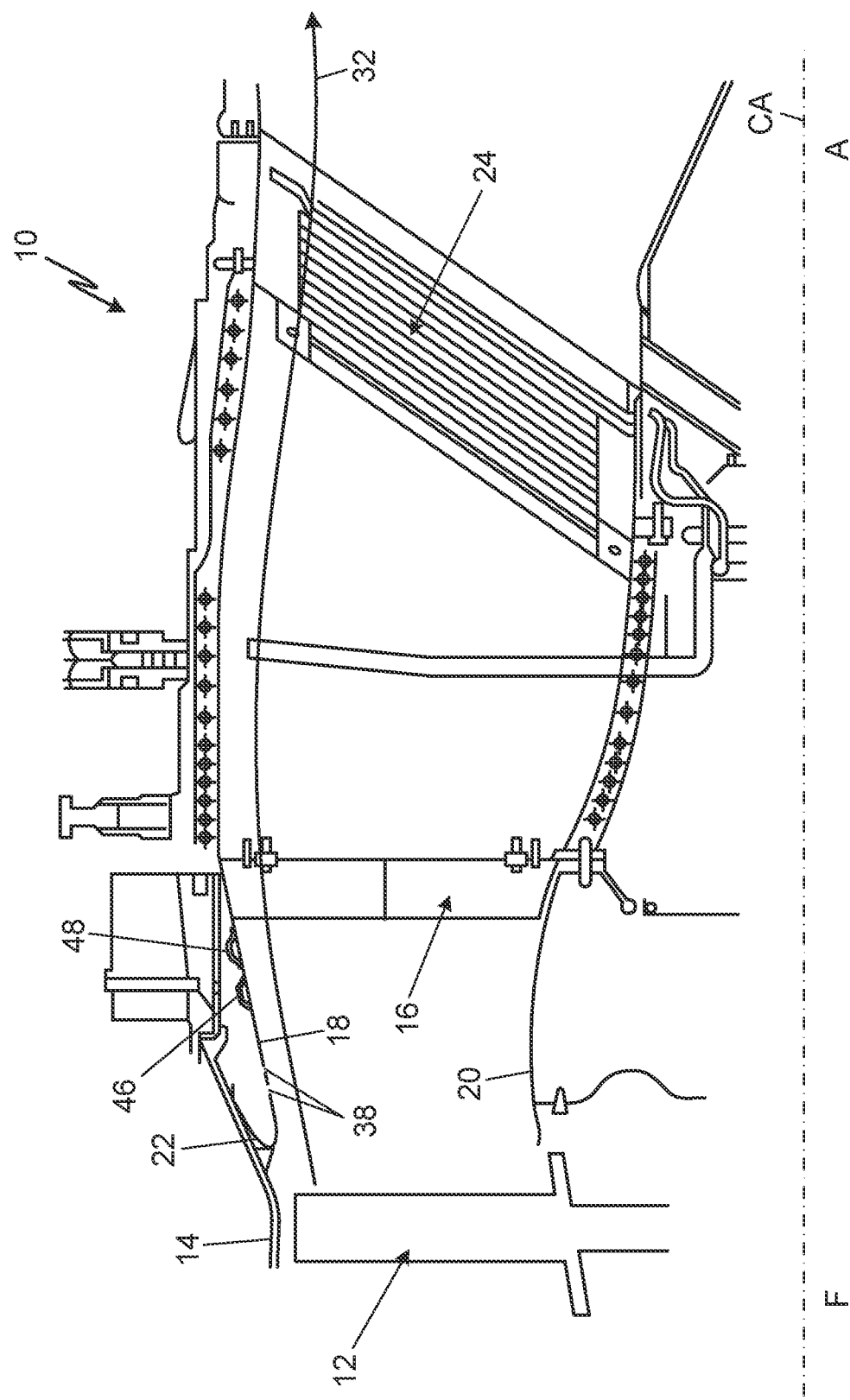
FIG. 1 is a schematic cross-sectional view of a portion of an aft section of a gas turbine engine.

FIG. 1 is a schematic cross-sectional view of a portion of an aft section of gas turbine engine 10 and illustrates a portion of low-pressure turbine (LPT) section 12 having LPT case 14, turbine exhaust case (TEC) assembly 16, forward outer diameter ring (FODR) 18, forward inner diameter ring 20, finger seal 22, and afterburner assembly 24. Gas turbine engine 10 has hot gas path 32 where hot gases can expand in LPT section 12 to do useful work and then the hot gases can flow through TEC assembly 16 and into afterburner assembly 24 along hot gas path 32. Hot gas path 32 has a generally annular shape defined about an engine central axis CA. In the illustrated embodiment, hot gas path 32 flows through TEC assembly 16 between FODR 18 and forward inner diameter ring 20. TEC assembly 16 can straighten flow and decrease turbulence in hot gas path 32 before reaching afterburner assembly 24, help improve the radar profile of gas turbine engine 10, and provide other known functionality. The basic operation of gas turbine engines is well known in the art, and therefore further discussion of such engine operation is unnecessary here.

Figure 2:
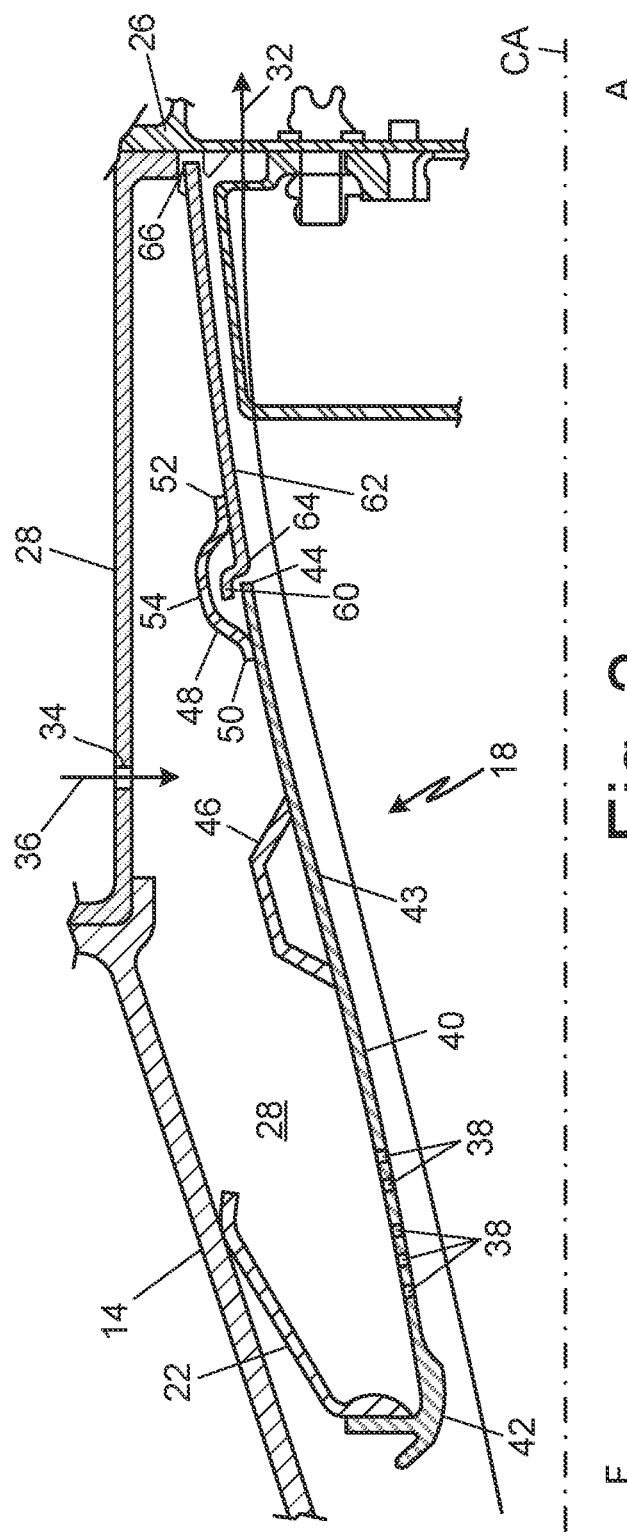
FIG. 2 is an enlarged cross-sectional view of a forward outer diameter ring of a turbine exhaust case assembly of the aft section of the gas turbine engine of FIG. 1.
Figure 3A:
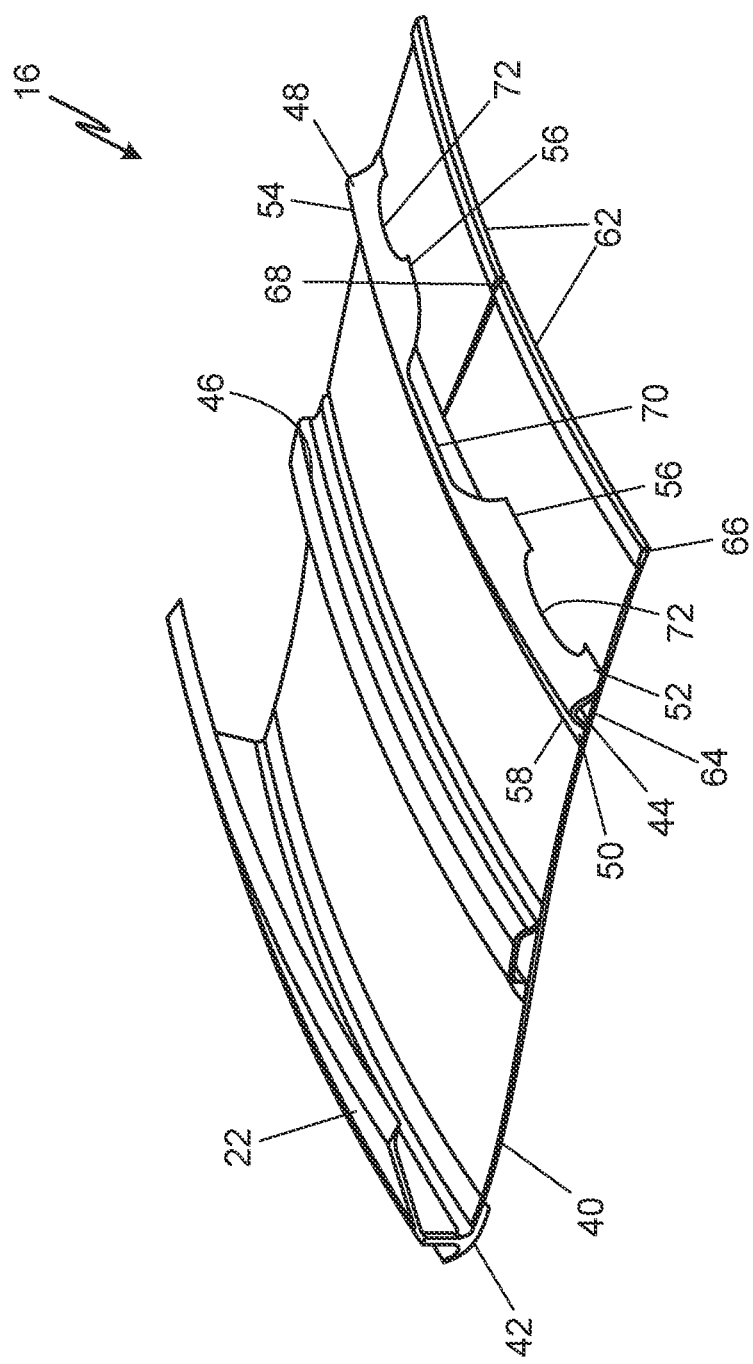
FIG. 3A is a perspective view of a forward outer diameter ring of the turbine exhaust case assembly.

FIG. 2 is an enlarged cross-sectional view of FODR 18 of turbine exhaust case assembly 16 of the aft section of gas turbine engine 10 of FIG. 1. FIG. 3A is a perspective view of an embodiment of FODR 18. FIG. 3B is a top view of FODR 18 from FIG. 3A. FIGS. 2-3B will be discussed together.

FIG. 2 illustrates FODR 18 and the associated LPT case 14, TEC strut 26, forward outer TEC 28, FODR plenum 30, and hot gas path 32. Forward outer TEC 28 can have inlet openings 34 formed therein which allow cooling fluid flow 36 therethrough into FODR plenum 30. In the example of FIGS. 2-3B, FODR 18 includes finger seal 22, flowpath ring 40, first hoop stiffener 46, second hoop stiffener 48, and case segments 62. Flowpath ring 40 axially extends between case first end 42 and case second end 44. Second hoop stiffener 48 axially extends between first stiffener end 50 and second stiffener end 52, with stiffener midsection 54 between first stiffener end 50 and second stiffener end 52. Tabs 56 (shown best in FIGS. 3A and 3B) are formed on second hoop stiffener 48 at second stiffener end 52. Second hoop stiffener 48 can optionally include full hoop 58, first circumferential cut 70, and second circumferential cuts 72. Case segments 62 axially extend between case segment first end 64 and case segment second end 66 with slot 68 formed between each pair of case segments 62. FODR 18 can also include circumferential ship lap seal 60. FODR plenum 30 can be defined by LPT case 14, FODR 18, finger seal 22, and forward outer TEC 28. FODR 18 guides a radially outer portion of hot gas path 32 to afterburner assembly 24.

TEC strut 26 is a strut which provides support to TEC assembly 16. TEC strut 26 can be radially outwards of and surrounds central axis CA. TEC strut 26 provides resistance to radial compression through two or more projections in the radial interior of TEC strut 26. One of the projections is shown in FIG. 2. TEC strut 26 allows hot gas path 32 through at aft end A. Forward outer TEC 28 axially connects to TEC strut 26 and LPT case 14. Forward outer TEC 28 can be connected to TEC strut 26 and LPT case 14 by welding, brazing, bolting, or any means of connecting two components as known to those of skill in the art. Forward outer TEC 28 appropriately spaces TEC strut 26 from LPT case 14 such that FODR 18 cannot freely move in the axial direction along central axis CA. During assembly, forward outer TEC 28 can be attached to LPT case 14 and FODR 18 can be placed radially inwards of LPT case 14 and forward outer TEC 28. Once FODR 18 has been inserted, TEC strut 26 can be attached to forward outer TEC 28 thereby putting an axial force onto FODR 18 to immobilize FODR 18 in the axial direction.

A free diameter of finger seal 22 is larger than an inner diameter of LPT case 14 such that when assembled a compression force by LPT case 14 against finger seal 22 will provide a seal against a flow from seeping from hot gas path 32 into FODR plenum 30. Furthermore, a conical shape of LPT case 14 provides an axial force on finger seal 22 to constrain finger seal 22 axially against TEC strut 26. TEC strut 26 provides a connection between LPT case 14 and forward outer TEC 28 to forward inner diameter ring 20. Finger seal 22 extends radially outward away from central axis CA and axially aft along central axis CA. Finger seal 22 can be connected to FODR 18 by any connection means known to those of skill in the art for connecting two components together. The other end of finger seal 22 rests against LPT case 14.

FODR plenum 30 can be a generally annularly shaped cavity located at an outer margin of hot gas path 32. FODR plenum 30 can be defined by the components surrounding FODR plenum 30. Specifically, FODR plenum 30 can be defined by LPT case 14, FODR 18, finger seal 22, forward outer TEC 28, and case segments 62. Because FODR 18 and FODR plenum 30 are exposed to or in close proximity to hot gas path 32, both are subject to heating during engine operation. Such heating can be traditionally problematic near TEC strut 26 as the pressure differential between hot gas path 32 and FODR plenum 30 can be reduced in the aft region of FODR 18 such that cooling can be less effective. Furthermore, hot gases in hot gas path 32 can decelerate and increase in pressure in the aft region, which can present hot gas stagnation and recirculation problems that further contribute to undesired heating. According to the present invention, FODR 18 can expand and contract circumferentially with the changing temperatures in order to limit thermal damage and undesired thermal gradients.

Forward outer TEC 28 includes a number of cooling fluid inlet openings 34 that connect the FODR plenum 30 to a cooling fluid supply in LPT case 14 (not shown in its entirety). Cooling fluid inlet openings 34 are just aft of finger seal 22. The cooling fluid can be bleed air from a relatively low temperature section of gas turbine engine 10, such as a compressor or fan section, and that bleed air can be collected and routed to LPT case 14 in a conventional manner. Inlet openings 34 can be circumferentially spaced and arranged in a single row, as shown in FIGS. 1 and 2, or arranged in multiple rows, with or without clocking between adjacent rows. Those skilled in the art will recognize that the particular pressure ratios can vary for particular applications.

Cooling fluid introduced into FODR plenum 30 can be exhausted from FODR plenum 30 into hot gas path 32 through one or more film cooling openings 38 defined radially through flowpath ring 40. Film cooling openings 38 provide film cooling along a radially inner surface of FODR 18 to help protect FODR 18 from accepting thermal energy present in hot gas path 32. The number and size of film cooling openings 38 should be selected such that a desired pressure ratio between FODR plenum 30 and hot gas path 32 can be maintained, in order to reduce a risk of hot gas inflow to FODR plenum 30. Film cooling openings 38 can be located in a generally upstream or forward region of FODR 18, and can be circumferentially spaced and arranged in a number of rows, with or without clocking between adjacent rows, as desired for particular applications. Greater film cooling effectiveness can generally be provided where film cooling openings 38 are located near case first end 42 of flowpath ring 40 rather than near case second end 44, because openings formed further aft (or downstream) pose a significant risk of undesired hot gas inflow due to the divergent shape of TEC assembly 16 across flowpath ring 40.

Flowpath ring 40 can be a ring which extends circumferentially around and axially along central axis CA. Flowpath ring 40 forms a flowpath surface for LPT case 14 and shields LPT case 14 from the high temperatures of hot gas path 32. At fore end F, near LPT section 12, flowpath ring 40 has case first end 42. At aft end A, opposite fore end F, flowpath ring 40 has case second end 44. As shown in FIGS. 2-3B, a diameter of case first end 42 can be smaller than a diameter of case second end 44. In alternative embodiments, a diameter of case first end 42 need not be smaller than a diameter of case second end 44 because minimal expansion of the gas is needed at the exhaust stage of the gas turbine. Case first end 42 can have a connection point for finger seal 22, which can have an increased thickness to accommodate the stress transferred by finger seal 22. Case first end 42 can likewise have a projection which extends fore and radially outwards from central axis CA. Flowpath ring 40 can have varying thicknesses throughout to support attachment points for first hoop stiffener 46 and second hoop stiffener 48. Flowpath ring 40 can be circumferentially supported by first hoop stiffener 46 and second hoop stiffener 48.

First hoop stiffener 46 is a radial stiffener which can be placed on the radially outer side of flowpath ring 40. First hoop stiffener 46 can extend completely around the circumference of flowpath ring 40. In the present embodiment, first hoop stiffener 46 can be placed at midpoint 43. Midpoint 43 is axially halfway between case first end 42 and case second end 44. In alternative embodiments, first hoop stiffener 46 can be placed axially anywhere along flowpath ring 40 in any position that one of skill in the art would recognize as providing support for flowpath ring 40. First hoop stiffener 46 can be formed of the same material as flowpath ring 40. Alternatively, first hoop stiffener 46 can be formed of a different material than flowpath ring 40 to provide greater or lesser resistance to radially displacement. In the present embodiment, a cross section parallel to central axis CA of first hoop stiffener 46 can be formed as an inverted U shape. In the embodiment shown in FIG. 2 the inverted U shape has pointed corners whereas in the embodiment shown in FIGS. 3A and 3B the inverted U shape has rounded corners. Specifically, the corners are pointed where first hoop stiffener 46 bends from a circumferential direction to a radial direction. Rounded corners such as those shown in FIGS. 3A and 3B can reduce stress concentration, although rounded corners can likewise increase manufacturing costs. In some embodiments, first hoop stiffener 46 can be welded or brazed to flow path ring 40. In alternative embodiments, first hoop stiffener 46 can be formed integral with flow path ring 40. In alternative embodiments, first hoop stiffener 46 can be formed of a V shape, a bell-shape, or any other shape known to those of skill in the art for resisting radial movements.

Second hoop stiffener 48 is a radial stiffener which can be placed on the radially outer side of flowpath ring 40 at case second 44. Second hoop stiffener 48 has first stiffener end 50 at fore end F of second hoop stiffener 48 with aft end A being second stiffener end 52. Second hoop stiffener 48 can be placed at a junction between flowpath ring 40 and case segments 62. Placing second hoop stiffener 48 at the junction permits second hoop stiffener 48 to be connected to both flowpath ring 40 and case segments 62. The junction can be formed by welds, brazes, bolts, rivets, formed integrally, or by any other connection mechanism known to those of skill in the art for connecting metals.

In the embodiment shown in FIGS. 3A and 3B first stiffener end 50 of second hoop stiffener 48 can be connected along an entirety of a circumference of second hoop stiffener 48 at case second end 44 to form full hoop 58. Alternatively, second hoop stiffener 48 can be connected to case second end 44 at a plurality of points which are less than the entirety of the circumference to reduce a weight but can increase the manufacturing costs as there are more processing steps. Second hoop stiffener 48 can be connected to each case segment 62 at case segment first end 64 at one or more points. These one or more points each can be tabs 56 formed in second hoop stiffener 48 at second stiffener end 52. Each tab 56 can provide a connection point to one or more case segments 62. Each tab 56 can be circumferentially spaced apart from one another around central axis CA. Second hoop stiffener 48 can have any number of first circumferential cut 70 and second circumferential cut 72 formed into second hoop stiffener 48 at second stiffener end 52. Alternatively, at second stiffener end 52, second hoop stiffener 48 can be connected to case segment 62 at every point along the circumference of second stiffener end 52 which could reduce cost due to simplicity but would increase weight. If second hoop stiffener 48 were connected to case segment 62 at every point along a circumference of second stiffener end 52, then there would be an absence of first circumferential cut 70 and second circumferential cut 72.

Connections between tab 56 and case segment 62 can be formed by welds, brazes, bolts, rivets, or any other connection mechanism known to those of skill in the art for connecting two parts together. These connections secure flowpath ring 40 to case segments 62 and furthermore provide resistance against radially outward movement by case segments 62. Second hoop stiffener 48 can be formed of the same material as flowpath ring 40. Alternatively, second hoop stiffener 48 can be formed of a different material than flowpath ring 40 to provide greater or lesser resistance to radially displacement.

In the present embodiment, second hoop stiffener 48 has a cross section parallel to central axis CA which can be bell-shaped. Specifically, stiffener midsection 54, which is the region axially halfway between first stiffener end 50 and second stiffener end 52, can project radially outwards and this projection can taper in an S shape from stiffener midsection 54 towards either first stiffener end 50 or second stiffener end 52. In alternative embodiments, second hoop stiffener 48 can be formed of a V shape, a U shape, or any other shape known to those of skill in the art for resisting radial movements. In the embodiments shown in FIG. 2, a thickness of first hoop stiffener 46 and second hoop stiffener 48 can be the same as a thickness of flowpath ring 40. In alternative embodiments, the thickness of first hoop stiffener 46 or second hoop stiffener 48 can be greater than or less than flowpath ring 40 to increase a radial mechanical resistance or to decrease weight, respectively.

Axially between case segment 62 and flowpath ring 40 can optionally be circumferential shiplap seal 60. Circumferential shiplap seal 60 extends circumferentially around flowpath ring 40 at case second end 44 and can extend completely around flowpath ring 40 where each case segment 62 is present. Circumferential shiplap seal 60 comprises a tab extending radially outward from each case segment 62 and extending axially fore from each case segment 62 to extend over case second end 44. Circumferential shiplap seal 60 can reduce a flow through any potential axial gap between case segment 62 and flowpath ring 40. As shown in FIG. 2, a cross-section parallel to central axis CA of circumferential shiplap seal 60 can be S-shaped. Alternatively, the cross-section could be z-shaped or c-shaped. These shapes enable a portion of circumferential shiplap seal 60 to be radially outwards of flowpath ring 40.

Each case segment 62 extends axially between flowpath ring 40 at case segment first end 64 and TEC strut 26 at case segment second end 66. Each case segment 62 can be connected to flowpath ring 40 at case segment first end 64 by second hoop stiffener 48 as discussed above. In the present embodiment, each case segment 62 can be substantially the same radial thickness as flowpath ring 40. There are a plurality of case segments 62 circumferentially spaced about central axis CA. Between each case segment 62 in the circumferential direction can be slot 68. Slot 68 can be an open slot such as shown in FIG. 3B. Alternatively, slot can be a seam between a first case segment and a second case segment. Optionally, slot 68 can be sealed with a seal such as shown below in FIGS. 5A-5F. Slot 68 can increase in circumferential width from a nominal width near flowpath ring 40 to a greater width towards aft end A. The change in circumferential width can taper circumferentially outwards as slot 68 extends aft. An angle formed between each case segment 62 can be selected from the group consisting of 1 degree, 2 degrees, 3 degrees, 5 degrees, or 7.5 degrees. A greater angle will accommodate greater thermal expansion but will create a larger gap when the engine is in the cold state. The angle can be optimized such that during operation, the heat created causes sufficient circumferential expansion of case segments 62 such that each slot 68 closes. Alternatively, slot 68 can be the same width in the axial direction which can reduce manufacturing costs but can lead to less closure between case segments 62 of aft end A during a hot state.

First circumferential cut 70 is a cut-out region of second hoop stiffener 48 positioned radially outwards from slot 68. First circumferential cut 70 can alternatively be called a scallop. First circumferential cut 70 can be on second stiffener end 52 of second hoop stiffener 48. First circumferential cut 70 can extend from second stiffener end 52 of second hoop stiffener 48 to stiffener midsection 54 of second hoop stiffener 48. In alternative embodiments, first circumferential cut 70 can cross stiffener midsection 54 towards first stiffener end 50 to accommodate a seal over slot 68 and further reduce a weight of second hoop stiffener 48. Circumferential sides of first circumferential cut 70 can taper axially toward second stiffener end 52 as first circumferential cut extends aft such that there are not sharp edges. First circumferential cut 70 can be circumferentially wider than slot 68, as shown in the embodiments of FIG. 3A and FIG. 3B. In alternative embodiments, first circumferential cut 70 can be any width required to accommodate a seal over slot 68 or to reduce weight and manufacturing cost of second hoop stiffener 48. First circumferential cut 70 can extend between each case segment 62.

Radially outward a circumferential center point of case segment 62 is second circumferential cut 72. A shape of second circumferential cut 72 can be substantially similar to first circumferential cut 70. Second circumferential cut 72 can likewise be alternatively or additionally referred to as a scallop. In contrast to the principal purpose of first circumferential cut 70, which can be accommodating a seal, the principal purpose of second circumferential cut 72 can be reducing a weight of second hoop stiffener 48. Creating a circumferentially wider second circumferential cut 72 can further reduce a weight of second hoop stiffener 48 but will likewise reduce the connection surface area between second hoop stiffener 48 and case segment 62. Substantially similarly to first circumferential cut 70, second circumferential cut 72 can be axially on second stiffener end 52 of second hoop stiffener 48 and does not cross stiffener midsection 54 of second hoop stiffener 48. In alternative embodiments, second circumferential cut 72 can cross stiffener midsection 54 to significantly reduce the weight of second hoop stiffener 48 if a strong enough material is used. Similar to first circumferential cut 70, second circumferential cut 72 can taper axially toward second stiffener end 52 as first circumferential cut extends aft such that there are not sharp edges.

Figure 4A:
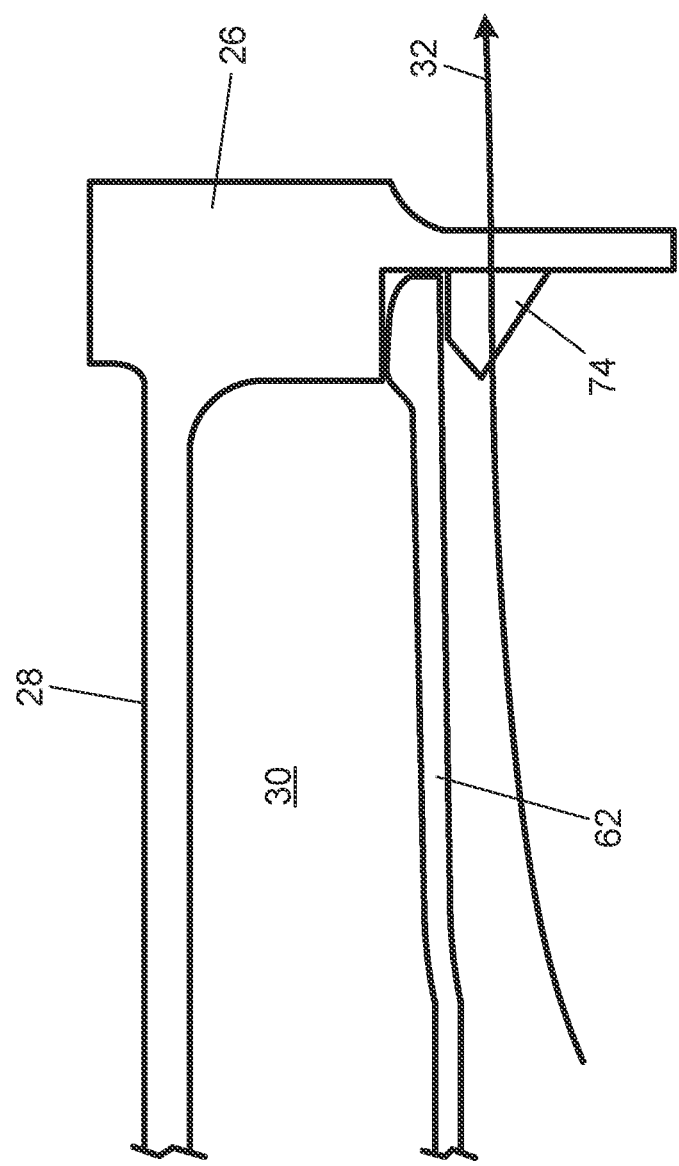
FIG. 4A is a cross-sectional view of a support flange for the forward outer diameter ring from FIG. 2.

FIGS. 4A and 4B are cross-sectional views of embodiments of support mechanisms to constrict a radially inwards movement of case segments 62 of case segments 62 during a cool state or under an inboard pressure loading. The support mechanisms keep case segments 62 in-line with TEC strut 26 such that hot gas path 32 stays laminar during the cool state as well as the hot state. FIGS. 4A and 4B will be discussed together.

FIG. 4A illustrates TEC strut 26, forward outer TEC 28, FODR plenum 30, hot gas path 32, case segments 62, and support flange 74. FIG. 4B illustrates TEC strut 26, forward outer TEC 28, FODR plenum 30, hot gas path 32, flowpath ring 40, case segments 62, support hook 76, and support hook slot 78.

The support mechanism of FIG. 4A is support flange 74. Support flange 74 can be an annular projection which can be connected to TEC strut 26. Support flange 74 extends fore from fore side F of TEC strut 26 and can be connected to TEC strut 26 at a radially outer portion. Support flange 74 can be one or more projections. Specifically, support flange 74 can be a projection which extends circumferentially about central axis CA and extends fore parallel to central axis CA. Support flange 74 radially supports a radially inner portion of aft end A of one or more case segments 62. Support flange 74 can be formed of the same materials as TEC strut 26 and forward outer TEC 28. A cross section parallel to central axis CA of support flange 74 can be an irregular quadrilateral as shown in FIG. 4A. Optionally case segments 62 can have circumferential positioning elements which extend from the aft inner diameter of case segments 62 into a portion of support flange 74 to provide circumferential positioning. Alternatively, support flange 74 can have as many sides or any shape as one of skill in the art would desire to radially support case segment 62.

The support mechanism of FIG. 4B is support hook 76. Support hook 76 can be a hook shaped projection which radially protrudes away from a radially outwards surface of case segment 62 at aft end A of the one or more case segments 62. A cross section parallel to the surface of case segment 62 of support hook 76 can be circular, rectangular, or alternatively, can be any shape known to those of skill in the art as reducing stress concentration in a support member. After assembly, support hook 76 sits in support hook slot 78. Support hook slot 78 can be a slot formed axially into fore end F of TEC strut 26. Support hook slot 78 extends axially aft from fore end F of TEC strut 26. Support hook slot 78 can be the same axial length as an axial component of support hook 76 or alternatively support hook slot 78 can be longer than support hook 76 to accommodate axial movement. Support hook slot 78 can be the same width as support hook 76 such that circumferential movement is constrained. Constraining circumferential movement of case segments can prevent movement about central axis CA.

Figure 5A:
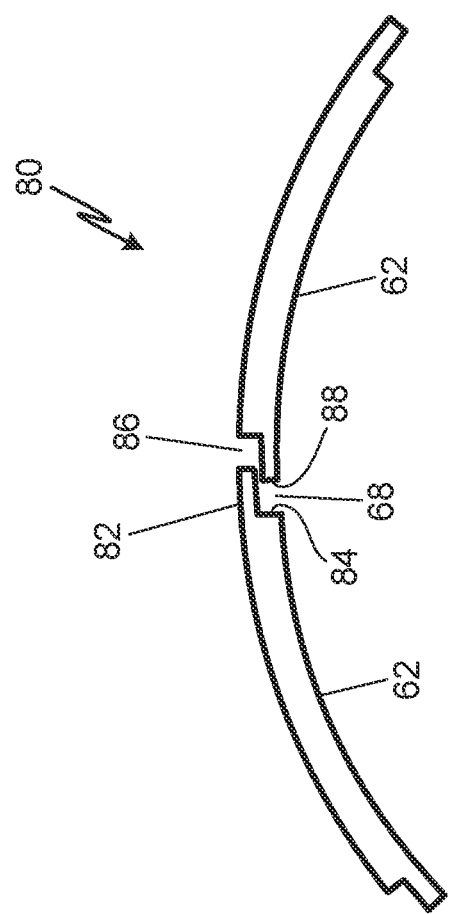
FIG. 5A is a cross-sectional view of a shiplap seal for an axial cut in a forward outer diameter ring.
Figure 5D:
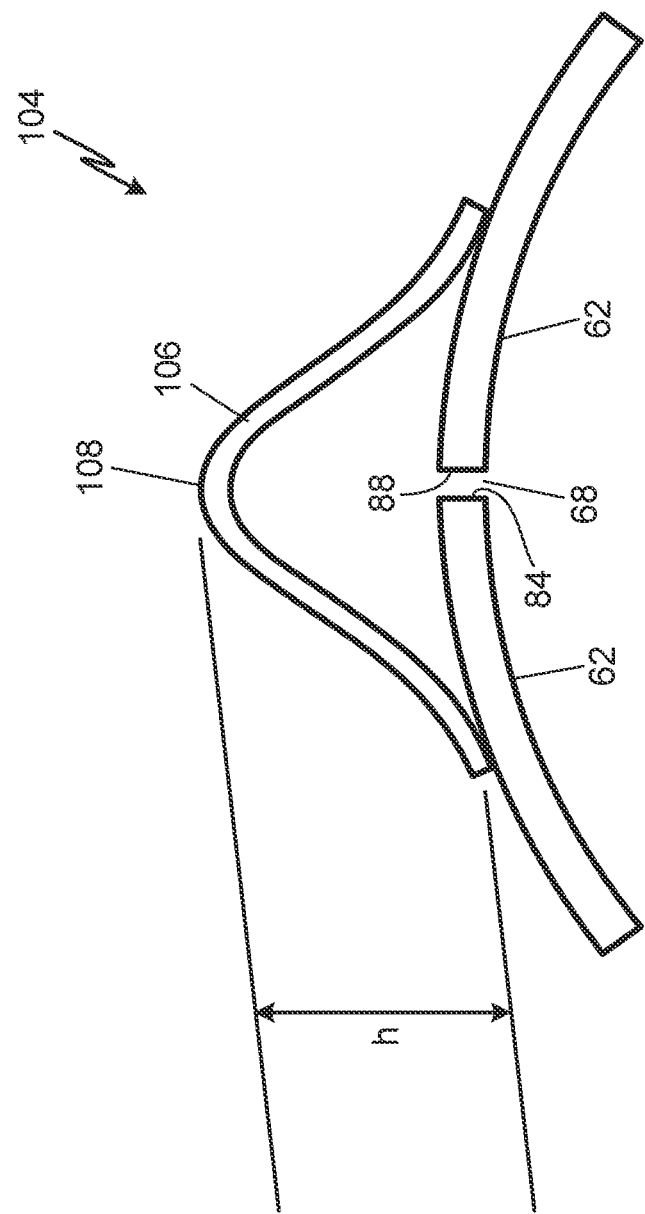
FIG. 5D is a cross-sectional view of a sealing rail for an axial cut in a forward outer diameter ring.
Figure 5E:
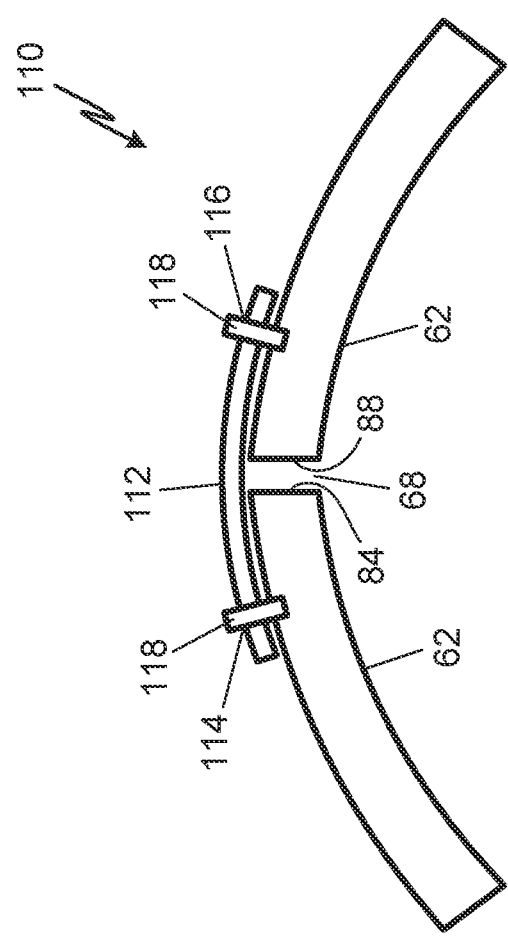
FIG. 5E is a cross-sectional view of a slotted seal plate for an axial cut in a forward outer diameter ring.
Figure 5F:
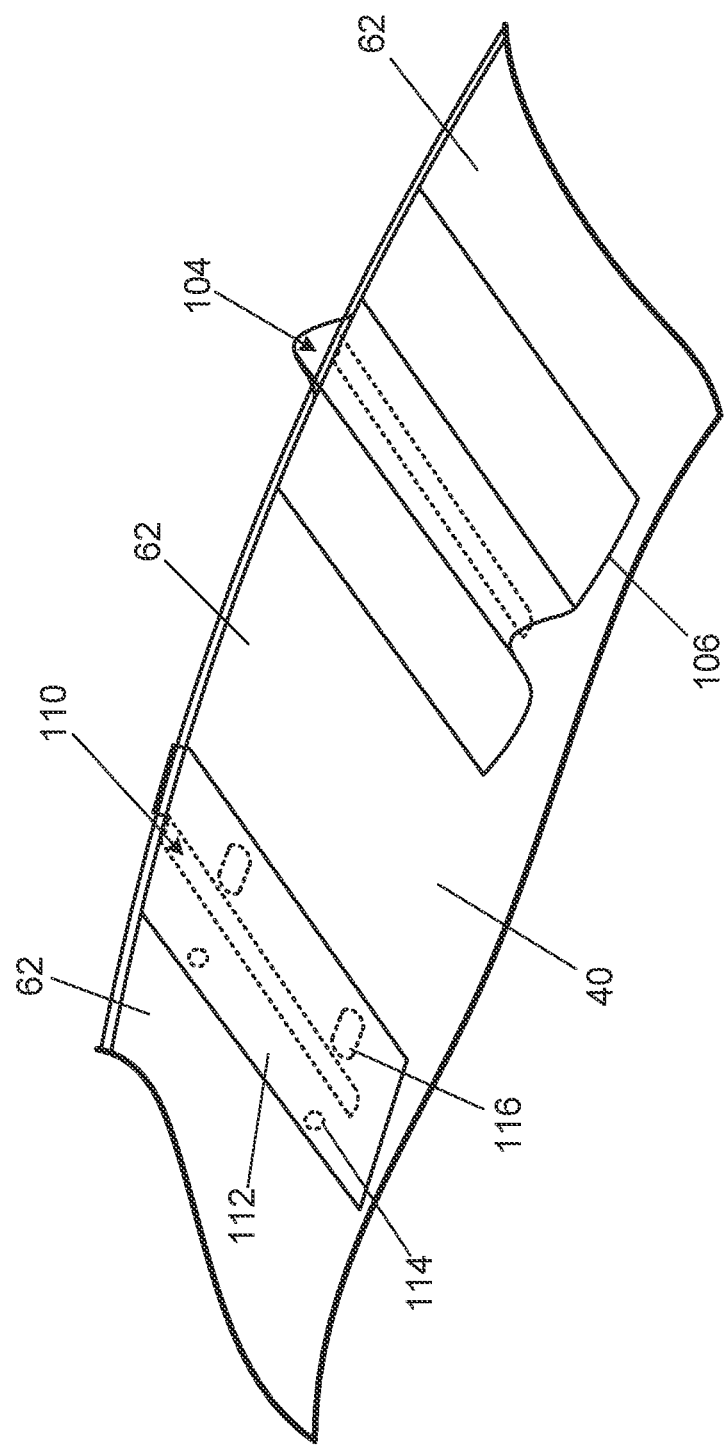
FIG. 5F is a perspective view of a sealing rail and a slotted seal plate for an axial cut in a forward outer diameter ring.

FIGS. 5A-5E are cross-sectional views of embodiments of seals. FIG. 5A illustrates shiplap seal 80. Shiplap seal 80 includes case segment 62, slot 68, first projection 82, first edge 84, first recess 86, and second edge 88. FIG. 5B illustrates feather seal 90. Feather seal 90 includes case segment 62, slot 68, first edge 84, second edge 88, first recess 92, second recess 94, and feather plate 96. FIG. 5C illustrates angle slot seal 98. Angle slot seal 98 includes case segment 62, slot 68, first edge 84, second edge 88, angled edge 100, and complementary angled edge 102. FIG. 5D illustrates rail seal 104. Rail seal 104 includes case segment 62, slot 68, first edge 84, second edge 88, rail plate 106, and rail plate midpoint 108. FIG. 5E illustrates slotted seal 110. Slotted seal 110 includes case segment 62, slot 68, first edge 84, second edge 88, slotted plate 112, hole 114, slot 116, and pin 118. FIG. 5F illustrates a perspective view of the embodiments of FIGS. 5D and 5E. Seals reduce transit of fluid through slot 68 from a first radial side to a second radial side. The seal primarily functions in the cool state since during the hot state, slot 68 shrinks in size due to the thermal expansion of case segments 62. FIGS. 5A-5F will be discussed below.

FIG. 5A is shiplap seal 80. Shiplap seal 80 can be formed from a first case segment 62 with first projection 82 which extends circumferentially into first recess 86 of a second case segment 62. First edge 84 is a circumferential edge of first case segment 62 while second edge 88 is a circumferential edge of second case segment 62 such that first edge 84 can circumferentially touch second edge 88 during a heated state. First projection 82 can be a circumferential projection which protrudes from the radially outward half of first edge 84 of case segment 62 while first recess 86 can be a circumferential recess which can be cut away from the radially outward half of second end of case segment 62. As shown in FIG. 5A, the radially inner half can be occupied by the non-projecting and non-recessed portions of the first case segment 62 and the second case segment 62. By having first projection 82 project into first recess 86, fluid can be impeded from traversing across slot 68 in the cool state. Once in a hot state and case segment 62 has thermally expanded, first projection 82 will take up most of first recess 86 such that first edge 84 and second edge 88 can touch. As such, shiplap seal 80 impedes movement of fluid in both a cool and hot state while accommodating the thermal expansion.

FIG. 5B is feather seal 90. Feather seal 90 can be formed by first recess 92 in a first case segment 62 and second recess 94 formed in a second case segment 62 with feather plate 96 extending into both first recess 92 and second recess 94. First recess 92 can be a recess which extends axially along first edge 84 of the first case segment 62 and extends circumferentially in a first direction into the first case segment 62. Second recess 94 can be a recess which extends axially along second edge 86 of the second case segment 62 and extends circumferentially in a second direction opposite the first direction into the second case segment 62. First edge 84 of the first case segment 62 faces second edge 88 of the second case segment 62. The regions in which first recess 92 and second recess 94 extend can be radially thickened to improve their mechanical characteristics. Feather plate 96 can be a plate which can be circumferentially wider than either first recess 92 of second recess 94 such that feather plate 96 cannot get stuck solely into first recess 92 or second recess 94. Feather plate 96 impedes fluid from traversing across feather seal 90. Once in a hot state and FODR 18 has thermally expanded, first edge 84 and second edge 88 can be contacting, however first recess 92 and second recess 94 are circumferentially deep enough such that feather plate 96 can avoid circumferential stress due to contact with circumferential ends of first recess 92 and second recess 94. As such, the feather seal 90 impedes movement of fluid in both a cool and hot state while accommodating thermal expansion.

FIG. 5C is angle slot seal 98. Angle slot seal 98 can be formed by angled edge 100 on first edge 84 of a first case segment 62 and complementary angled edge 102 on second edge 86 of a second case segment 62. Angled edge 100 can have a slope such that angled edge 100 narrows in a radial direction relative to central axis CA as the first circumferential edge extends circumferentially relative to central axis CA. Complimentary angled edge 102 can be a circumferential edge of the second case segment 62 which has a slope such that complimentary angled edge 102 narrows in a radial direction relative to central axis CA as the circumferential edge extends circumferentially relative to central axis CA. The slope of angled edge 100 can be substantially similar to the slope of complementary angled edge 102 as shown in FIG. 5C. Alternatively, the slopes can be different which could lead to worse sealing performance but could accommodate larger displacements. In the cool state, angled edge 100 rests on complementary angled edge 102. A radially inward pressure on the radially outer surface pushes angled edge 100 into complementary angled edge 102 to form a seal. A radially outward pressure from the radially inner surface outwards pushes complementary angled edge 102 against angled edge 100 to also form a seal. In the heated state, the first case segment 62 expands which can be accommodated by the sloped surfaces of angled edge 100 and complementary angled edge 102 as the edges are able to slide past each other while maintaining the seal.

FIG. 5D is rail seal 104. FIG. 5E is slotted seal 110. FIG. 5F is a perspective view of both rail seal 104 and slotted seal 110. FIGS. 5D-5F will be discussed together.

Rail seal 104 is formed by rail plate 106 which extends radially away to height h at rail plate midpoint 108. Rail plate 106 can be connected to the first case segment 62 and the second case segment 62 such that rail plate 106 limits escape of fluid through these connected points. Rail plate 106 can be formed of the same material as first case segment 62 or second case segment 62. As shown in FIG. 5D, rail plate 106 can have a bell-shaped cross-section in the circumferential direction. In alternative embodiments, rail plate 106 can be a U shape, a V shape, or any other shape known to those of skill in the art as accommodating a circumferential expansion and contraction. In the cool state, rail plate 106 will limit fluid escape through the connected portions of rail plate 106. In the hot state, rail plate 106 will accommodate circumferential expansion and limit fluid escape between the first case segment 62 and the second case segment 62. Fluid can still leak through the axial ends of the bell-shaped rail plate. End leakage can be resolved through crimping of the ends, by placing flat blocks at the ends, or by any other method known to those of skill in the art for stopping flow through a region. As best seen in FIG. 5F, rail plate 106 attaches to the first case segment 62 and the second case segment 62 such that rail plate 106 that will plastically bend during heating and cooling.

Slotted seal 110 can be formed by slotted plate 112 which extends axially along slot 68. Slotted plate 112 curves from a first case segment 62 to a second case segment 62 and over slot 68 in-between the first case segment 62 and the second case segment 62. Slotted plate 112 has hole 114 on a first circumferential side and slot 116 on a second circumferential side. Hole 114 can be formed in slotted plate 112 on a circumferential side near the first case segment 62 and slot 116 can be formed in slotted plate 112 on a circumferential side near the second case segment 62. Hole 114 and slot 116 extend radially through slotted plate 112. One or more pin 118 are formed onto a radially outer side of the first case segment 62 and the second case segment 62. Pin 118 can be any fastener known to those of skill in the art as being able to keep two parts together. As best seen on FIG. 5F, hole 114 can be a circular hole such that any pin 118 which can be inserted therein will not be able to move circumferentially. Slot 116 can be an elongated hole such that any pin 118 inserted therein will be able to move circumferentially. Specifically, slot 116 can extend circumferentially such that slot 116 occupies a region between slot 68 and a circumferential edge of slotted plate 112 over the second case segment 62. As such slotted plate 112 will not be able to move with respect to pin 118 in hole 114 but can move with respect to pin 118 in slot 116. Therefore, the movement of pin 118 in slot 116 permits for slotted plate 112 to accommodate circumferential movement caused by the heating or cooling of slotted seal 110.

Discussion of Possible Embodiments

The following are non-exclusive descriptions of possible embodiments of the present invention. A forward outer diameter ring according to an exemplary embodiment of this disclosure, among other possible things includes a flowpath ring extending circumferentially about a central axis and extending axially from a first end to a second end relative to the central axis. The second end is axially aft of the first end. The forward outer diameter ring further includes a hoop stiffener connected to the second end of the flowpath ring and extending circumferentially around the second end of the flowpath ring. The hoop stiffener includes a first stiffener end connected to the second end of the flowpath ring, a second stiffener end axially aft of the first stiffener end, and tabs formed in the second stiffener end. The tabs are circumferentially spaced apart from one another. The forward outer diameter ring further includes case segments connected to the second stiffener end by the tabs, and wherein the case segments are circumferentially arranged about the central axis relative one another.

The forward outer diameter ring of the preceding paragraph can optionally include, additionally and/or alternatively, any one or more of the following features, configurations and/or additional components:

A further embodiment of the foregoing forward outer diameter ring includes a finger seal extending radially outward and axially aft from the first end of the flowpath ring, wherein the finger seal is connected to the flowpath ring at the first end of the flowpath ring.

A further embodiment of any of the foregoing forward outer diameter rings includes a second hoop stiffener connected to a radially outer side of the flowpath ring between the first end and the second end of the flowpath ring, wherein the second hoop stiffener extends circumferentially around the flowpath ring.

A further embodiment of any of the foregoing forward outer diameter rings, wherein the hoop stiffener further includes a full hoop formed on the first stiffener end and extending circumferentially about the second end of the flowpath ring and extending completely around the second end of the flowpath ring.

A further embodiment of any of the foregoing forward outer diameter rings, wherein a midsection between the first stiffener end and the second stiffener end of the hoop stiffener curves radially outward from both the first stiffener end and the second stiffener end.

A further embodiment of any of the foregoing forward outer diameter rings, wherein an axial cross-section of the hoop stiffener from the first stiffener end to the second stiffener end is bell-shaped.

A further embodiment of any of the foregoing forward outer diameter rings includes circumferential cuts on the second stiffener end, wherein each of the circumferential cuts extends between two of the tabs, and wherein each circumferential cut extends over a seam between a first case segment and a second case segment.

A further embodiment of any of the foregoing forward outer diameter rings, wherein each of the circumferential cuts tapers axially toward the second stiffener end as each of the circumferential cuts extends aft.

A further embodiment of any of the foregoing forward outer diameter rings includes a slot between a first case segment and a second case segment of the case segments.

A further embodiment of any of the foregoing forward outer diameter rings includes a seal extending axially along the slot, wherein the seal is connected to the first case segment and the second case segment.

A further embodiment of any of the foregoing forward outer diameter rings, wherein the seal is a feather seal, the feather seal further includes a first recess formed in a first edge of the first case segment, and wherein the first recess extends axially along the first edge and extends circumferentially into the first edge of the first case segment. The feather seal further includes a second recess formed in a second edge of the second case segment, wherein the second recess extends axially along the second edge and extends circumferentially into the second edge of the second case segment, and wherein the second edge of the second case segment faces the first edge of the first case segment. The feather seal further includes a plate in the first and second recesses and extending in the slot between the first case segment and the second case segment.

A further embodiment of any of the foregoing forward outer diameter rings, wherein the seal is a sealing rail that includes: a plate that projects radially outward at a midpoint between the two case segment connections, and a cross-section parallel to the central axis of the sealing rail and bell-shaped.

A further embodiment of any of the foregoing forward outer diameter rings, wherein the seal comprises: a plate curving from the first case segment to the second case segment and over the slot, wherein the plate includes one or more holes extending through the plate over the first case segment and one or more slots extending through the plate over the second case segment. Each of the one or more slots is elongated in a circumferential direction relative to the central axis. One or more fasteners extend through the one or more holes and connects the plate to the first case segment. One or more pins extends radially from the second case segment and into the one or more slots to form a sliding connection between the plate and the second case segment.

A further embodiment of any of the foregoing forward outer diameter rings, wherein the case segments comprise: a first case segment with a first edge extending axially along a length of the first case segment relative the central axis, and a second case segment with a second edge extending axially along a length of the second case segment relative to the central axis. The first edge and the second edge overlap.

A further embodiment of any of the foregoing forward outer diameter rings, wherein the first edge of the first case segment shiplaps with the second edge of the second case segment.

A further embodiment of any of the foregoing forward outer diameter rings, wherein the first edge of the first case segment is angled and narrows in a radial direction relative to the central axis as the first edge extends circumferentially relative to the central axis. The second edge of the second case segment is angled and narrows in the radial direction as the second edge extends circumferentially relative to the central axis. The first edge and the second edge include matching slopes.

A further embodiment of any of the foregoing forward outer diameter rings further includes a ship-lap seal axially between the flowpath ring and one or more of the case segments. The ship-lap seal includes a tab extending radially outward from each case segment and extending forward from each case segment to extend over the second end of the flowpath ring and overlap with the second end of the flowpath ring. The ship-lap seal extends circumferentially around the second end of the flowpath ring.

A further embodiment of any of the foregoing forward outer diameter rings includes support hooks connected to a radially outer surface of one or more of the case segments at an aft end of the one or more of the case segments and configured to project into a support hook slot formed in a turbine exhaust case strut.

A further embodiment of any of the foregoing forward outer diameter rings includes a support flange extending circumferentially around the central axis. The support flange is connected to a radially outer portion on a fore side of turbine exhaust case strut. The support flange is configured to radially support a radially inner portion of an aft end of one or more of the case segments.

A cooled turbine exhaust case assembly according to an exemplary embodiment of this disclosure, among other possible things includes a forward outer diameter ring. The forward outer diameter ring includes a flowpath ring extending circumferentially about a central axis and extending axially from a first end to a second end relative to the central axis. The second end is axially aft of the first end. The forward outer diameter ring further includes a hoop stiffener connected to the second end of the flowpath ring and extending circumferentially around the second end of the flowpath ring. The hoop stiffener further includes a first stiffener end connected to the second end of the flowpath ring, a second stiffener end axially aft of the first stiffener end, and tabs formed in the second stiffener end. The tabs are circumferentially spaced apart from one another. The forward outer diameter ring further includes case segments connected to the second stiffener end by the tabs, and the case segments are circumferentially spaced about the central axis from one another. The forward outer diameter ring further includes a slot between each pair of the case segments and a seal extending axially along the slot, with the seal connected to two of the case segments. The cooled turbine exhaust case assembly further includes a turbine case located radially outward of the forward outer diameter ring. A turbine exhaust case is axially aft of the turbine case and is connected to the turbine case via a forward outer turbine exhaust case. A plenum is defined by the forward outer diameter ring, the turbine case, the turbine exhaust case, and the forward outer turbine exhaust case. An inlet opening is in the turbine case for introducing cooling air to the plenum. One or more film cooling openings are in a fore region of the forward outer diameter ring and is configured to allow cooling air to exit the plenum to a hot gas path of the gas turbine engine to provide film cooling to the forward outer diameter ring.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A forward outer diameter ring comprising:
   a flowpath ring extending circumferentially about a central axis and extending axially from a first end to a second end relative to the central axis, wherein the second end is axially aft of the first end;
   a hoop stiffener connected to the second end of the flowpath ring and extending circumferentially around the second end of the flowpath ring, and wherein the hoop stiffener comprises:
      a first stiffener end connected to the second end of the flowpath ring;
      a second stiffener end axially aft of the first stiffener end; and
      tabs formed in the second stiffener end, and wherein the tabs are circumferentially spaced apart from one another;
   case segments connected to the second stiffener end by the tabs, and wherein the case segments are circumferentially arranged about the central axis relative one another; and
   a slot between a first case segment and a second case segment of the case segments.

2. The forward outer diameter ring of claim 1 further comprising:
   a finger seal extending radially outward and axially aft from the first end of the flowpath ring, wherein the finger seal is connected to the flowpath ring at the first end of the flowpath ring.

3. The forward outer diameter ring of claim 1 further comprising:
   a second hoop stiffener connected to a radially outer side of the flowpath ring between the first end and the second end of the flowpath ring, wherein the second hoop stiffener extends circumferentially around the flowpath ring.

4. The forward outer diameter ring of claim 1, wherein the hoop stiffener further comprises:
   a full hoop formed on the first stiffener end and extending circumferentially about the second end of the flowpath ring and extending completely around the second end of the flowpath ring.

5. The forward outer diameter ring of claim 4, wherein the hoop stiffener further comprises a midsection between the first stiffener end and the second stiffener end of the hoop stiffener curves radially outward from both the first stiffener end and the second stiffener end.

6. The forward outer diameter ring of claim 5, wherein the hoop stiffener further comprises:
   an axial cross-section of the hoop stiffener from the first stiffener end to the second stiffener end is bell-shaped.

7. The forward outer diameter ring of claim 4, wherein the hoop stiffener further comprises:
   circumferential cuts on the second stiffener end, wherein each of the circumferential cuts extends between two of the tabs, and wherein each circumferential cut extends over a seam between two of the case segments.

8. The forward outer diameter ring of claim 7, wherein each of the circumferential cuts tapers axially toward the second stiffener end as each of the circumferential cuts extends aft.

9. The forward outer diameter ring of claim 1 further comprising:
a seal extending axially along the slot, wherein the seal is connected to the first case segment and the second case segment.

10. The forward outer diameter ring of claim 9, wherein the seal is a feather seal, the feather seal comprising:
a first recess formed in a first edge of the first case segment, wherein the first recess extends axially along the first edge and extends circumferentially into the first edge of the first case segment;
a second recess formed in a second edge of the second case segment, wherein the second recess extends axially along the second edge and extends circumferentially into the second edge of the second case segment, and wherein the second edge of the second case segment faces the first edge of the first case segment; and
a plate in the first and second recesses and extending in the slot between the first case segment and the second case segment.

11. The forward outer diameter ring of claim 9, wherein the seal is a sealing rail comprising: a plate wherein the plate projects radially outward to a midpoint of the plate; and a cross-sectional profile that is bell-shaped.

12. The forward outer diameter ring of claim 9, wherein the seal comprises:
a plate curving from the first case segment to the second case segment and over the slot, wherein the plate comprises:
one or more holes extending through the plate over the first case segment; and
one or more slots extending through the plate over the second case segment, wherein each of the one or more slots is elongated in a circumferential direction relative to the central axis;
one or more fasteners extending through the one or more holes and connecting the plate to the first case segment; and
one or more pins extending radially from the second case segment and into the one or more slots to form a sliding connection between the plate and the second case segment.

13. The forward outer diameter ring of claim 1, wherein:
the first case segment comprising a first edge extending axially along a length of the first case segment relative the central axis; and the second case segment comprising a second edge extending axially along a length of the second case segment relative to the central axis, and
wherein the first edge and the second edge overlap.

14. The forward outer diameter ring of claim 13, wherein the first edge of the first case segment shiplaps with the second edge of the second case segment.

15. The forward outer diameter ring of claim 13, wherein the first edge of the first case segment is angled and narrows in a radial direction relative to the central axis as the first edge extends circumferentially relative to the central axis, wherein the second edge of the second case segment is angled and narrows in the radial direction as the second edge extends circumferentially relative to the central axis, and wherein the first edge and the second edge comprise matching slopes.

16. The forward outer diameter ring of claim 1, further comprising a ship-lap seal axially between the flowpath ring and one or more of the case segments, the ship-lap seal comprising a tab extending radially outward from each case segment and extending forward from each case segment to extend over the second end of the flowpath ring and overlap with the second end of the flowpath ring, and wherein the ship-lap seal extends circumferentially around the second end of the flowpath ring.

17. The forward outer diameter ring of claim 1, further comprising:
support hooks connected to a radially outer surface of one or more of the case segments at an aft end of the one or more of the case segments and configured to project into a support hook slot formed in a turbine exhaust case strut.

18. The forward outer diameter ring of claim 1 further comprising:
a support flange extending circumferentially around the central axis, the support flange connected to a radially outer portion on a fore side of a turbine exhaust case strut, and wherein the support flange is configured to radially support a radially inner portion of an aft end of one or more of the case segments.

19. A cooled turbine exhaust case assembly for a gas turbine engine, the assembly comprising:
a forward outer diameter ring, the forward outer diameter ring comprising:
a flowpath ring extending circumferentially about a central axis and extending axially from a first end to a second end relative to the central axis, wherein the second end is axially aft of the first end;
a hoop stiffener connected to the second end of the flowpath ring and extending circumferentially around the second end of the flowpath ring, and wherein the hoop stiffener comprises:
a first stiffener end connected to the second end of the flowpath ring;
a second stiffener end axially aft of the first stiffener end; and
tabs formed in the second stiffener end, and wherein the tabs are circumferentially spaced apart from one another;
case segments connected to the second stiffener end by the tabs, and wherein the case segments are circumferentially spaced about the central axis from one another;
a slot between each pair of the case segments; and
a seal extending axially along the slot, wherein the seal is connected to two of the case segments;
a turbine case located radially outward of the forward outer diameter ring;
a turbine exhaust case axially aft the turbine case and connected to the turbine case via a forward outer turbine exhaust case;
a plenum defined by the forward outer diameter ring, the turbine case, the turbine exhaust case, and the forward outer turbine exhaust case;
an inlet opening in the turbine case for introducing cooling air to the plenum; and
one or more film cooling openings in a fore region of the forward outer diameter ring configured to allow cooling air to exit the plenum to a hot gas path of the gas turbine engine to provide film cooling to the forward outer diameter ring.

\* \* \* \* \*